(No Model.)

I. J. W. ADAMS.
BASKET OR CARRIER.

No. 399,811. Patented Mar. 19, 1889.

WITNESSES:

INVENTOR.
J. J. W. Adams
BY
Munn & Co.
ATTORNEYS

UNITED STATES PATENT OFFICE.

ISAAC J. W. ADAMS, OF LAUREL, DELAWARE.

BASKET OR CARRIER.

SPECIFICATION forming part of Letters Patent No. 399,811, dated March 19, 1889.

Application filed November 2, 1888. Serial No. 289,800. (No model.)

*To all whom it may concern:*

Be it known that I, ISAAC JOHN WOOTTEN ADAMS, of Laurel, in the county of Sussex and State of Delaware, have invented a new and Improved Basket or Carrier, of which the following is a full, clear, and exact description.

This invention relates to baskets or carriers, the invention consisting in the construction hereinafter described, and specifically pointed out in the claim.

Reference is to be had to the accompanying drawings, forming a part of this specification, in which similar figures of reference indicate corresponding parts in all the views.

Figure 1:
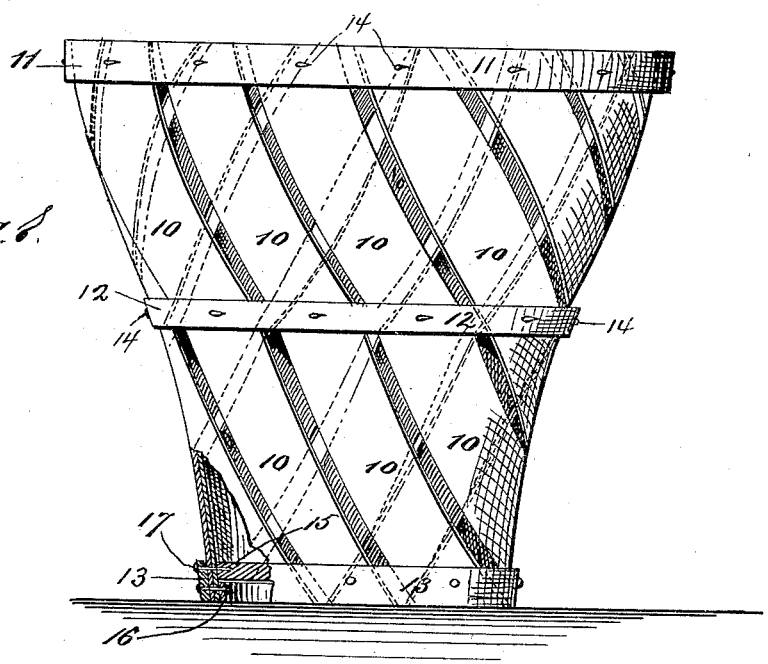
Figure 2:
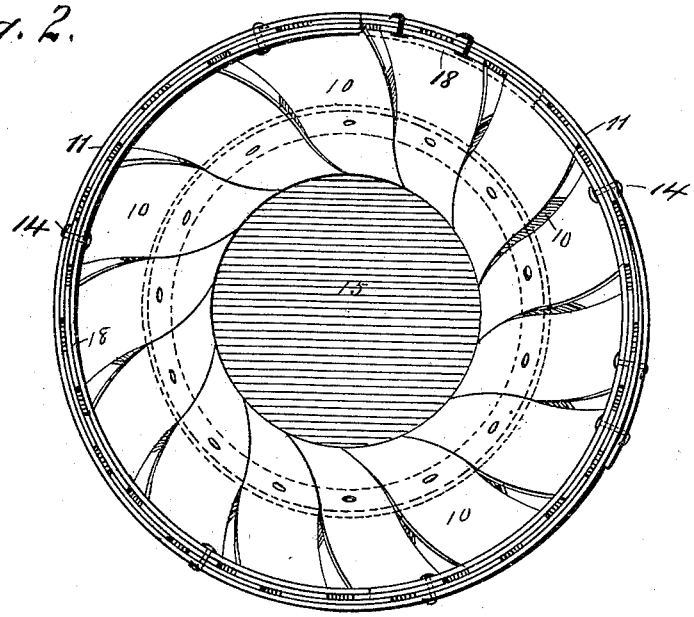
Figure 3:
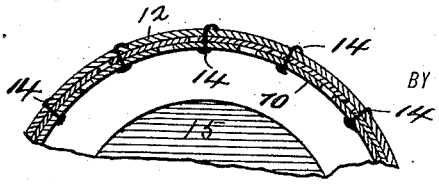

Figure 1 is a side view of a basket embodying my invention, parts being broken away. Fig. 2 is a plan view of the basket, and Fig. 3 is a sectional view of a portion thereof.

In the drawings, 10 represents the inner and outer series of slats of a basket or carrier, the inner series of slats being oppositely inclined to the outer series, so that the two series will cross each other. The slats are held together at their ends and middle portions, respectively, by the hoops 11, 13, and 12, respectively. Nails or other fastenings, 14, are driven through the slats and hoops 11 12 from the inside and clinched at their points.

After the slats have been secured to their outer hoops I place a small inner hoop, 16, near what will be the bottom of the basket or carrier, this hoop serving as the support for the bottom board, 15, and in order that the bottom board may be held against accidental displacement I secure it by means of nails 17, that are passed through the hoop 13, the overlapped ends of the inner and outer slats, 10, and into the edge of the board, as shown in Fig. 1, and I prefer to place a hoop, 18, just at the upper end and inside of the carrier.

In the foregoing specification I have used the term "carriers" generically, intending thereby to cover barrels or other receptacles not specifically mentioned in the specification.

Having thus described my invention, I claim as new and desire to secure by Letters Patent—

A carrier comprising a body formed of two series of inner and outer oppositely-inclined crossing slats 10, the hoops 11 12, fastenings driven through said hoops and through the slats at their points of crossing, the bottom 15, the hoop 16 under it, the outer hoop, 13, the fastenings 17 driven through said hoop and lower overlapped ends of the slats into the bottom, and other fastenings driven through the hoop 13 and said overlapped lower ends into the inner hoop, 16.

ISAAC J. W. ADAMS.

Witnesses:
ISAAC E. HEARN,
WILLIAM S. VAUGHAN.